United States Patent
Marzolf

[15] 3,652,918
[45] Mar. 28, 1972

[54] SWITCHING INVERTER WITH SINE WAVE OUTPUT

[72] Inventor: Joseph M. Marzolf, Falls Church, Va.

[73] Assignee: The United States of America as represented by the Secretary of the United States Navy

[22] Filed: Sept. 30, 1970

[21] Appl. No.: 76,910

[52] U.S. Cl. ..........................321/9 R, 307/221 B, 307/223 B, 321/DIG. 1
[51] Int. Cl. .........................................................H02m 1/12
[58] Field of Search..........................321/5, 9 R, 9 A, DIG. 1; 323/43.55; 307/227, 221, 223; 328/186

[56] References Cited

UNITED STATES PATENTS

| | | | |
|---|---|---|---|
| 3,470,449 | 9/1969 | Risberg | 321/11 |
| 3,482,114 | 12/1969 | Marshall | 307/221 B |
| 3,321,693 | 5/1967 | Heinrich et al. | 321/5 |
| 3,514,688 | 5/1970 | Martin | 321/9 X |
| 3,227,889 | 1/1966 | Paynter | 307/227 X |
| 3,329,831 | 7/1967 | Abramson et al. | 307/223 B |

FOREIGN PATENTS OR APPLICATIONS

| | | | |
|---|---|---|---|
| 680,926 | 2/1964 | Canada | 321/DIG. 1 |
| 1,339,607 | 1/1966 | France | 321/5 |

OTHER PUBLICATIONS

Electronic Design pp. 74–77, Jan. 20, 1964.

Primary Examiner—William H. Beha, Jr.
Attorney—R. S. Sciascia, Arthur L. Branning, J. G. Murray and Sol Sheinbein

[57] ABSTRACT

A technique of producing a sine wave output from a solid state inverter using Triacs as switches to supply the sine wave output from a DC input.

2 Claims, 8 Drawing Figures (REVERSED)

3,652,918

SWITCHING INVERTER WITH SINE WAVE OUTPUT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Semiconductor devices are widely used in DC to AC inverters and DC to DC converters and are most conveniently and efficiently employed as switches. This method of employment inherently produces square wave outputs. When used for DC to DC converters, this characteristic is desirable since it produces minimum ripple in the rectified DC output. However many electrical loads are designed for sine wave inputs, which cannot be efficiently supplied by square loop magnetic cores and semiconductor switches.

Many attempts have been made to overcome this incompatibility by using multiple switches to approximate a sine wave output. Invariably, however, such attempts have evolved such complex circuits as to be unacceptable from the standpoint of reliability and cost. This complexity is caused by the need for a reasonably large number of steps (and therefore switches) to produce an acceptable sine wave and, also, since most semiconductor devices, such as SCR's are unidirectional, different switches must be used for the positive and negative half cycles of the sine wave. Such circuits can very quickly become incredibly complex. In any event, all such circuits represent a tradeoff between complexity and quality of the sine wave.

SUMMARY OF THE INVENTION

This invention has all the advantages of similar prior art devices while requiring a considerably smaller number of component parts. It provides for a relatively simple method for obtaining a multiple stepped sine wave output using semiconductor devices as switches. An inverter is used to provide multiple voltage to Triacs which are then sequenced to supply the proper voltages to the load by a sequencing circuit which is controlled by the inverter.

OBJECTS OF THE INVENTION

It is therefore an object of the present invention to provide a sine wave output from an inverter utilizing fewer components.

A further object of the present invention is to provide a sine wave output from a DC source that requires less filtering.

A still further object of the present invention is to provide a switching inverter that is smaller and lighter than conventional inverters.

Yet another object of the present invention to provide a DC to AC inverter with an approximate sine wave output using multiple switches in a relatively simple manner.

These and other objects of the present invention will become more apparent upon consideration of the specification, claims, and drawings of which:

FIG. 1 is a block diagram of the invention;
FIG. 2 is a schematic diagram of the basic inverter circuit;
FIG. 3 is a schematic diagram of the sequencing circuit;
FIG. 4 is a schematic diagram of the power switching circuits; and
FIGS. 5a through 5d show the waveshapes of the output waveforms from the circuits of FIG. 4.

DESCRIPTION OF THE PREFERRED EMBODIMENT

Figure 1:
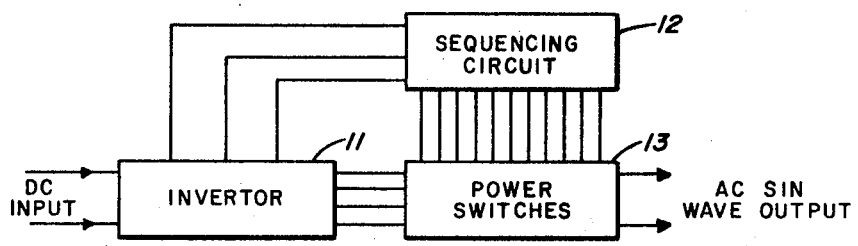

Referring now to FIG. 1, the block diagram comprises three basic functional circuits, inverter 11, sequencing circuit 12, and power switches 13. A DC input to the inverter 11 provides multiple voltage outputs to power switches 13 and the power and timing intervals to sequencing circuit 12 which in turn activates the power switches to supply the proper AC sine wave output to the load in the proper sequence.

Figure 2:
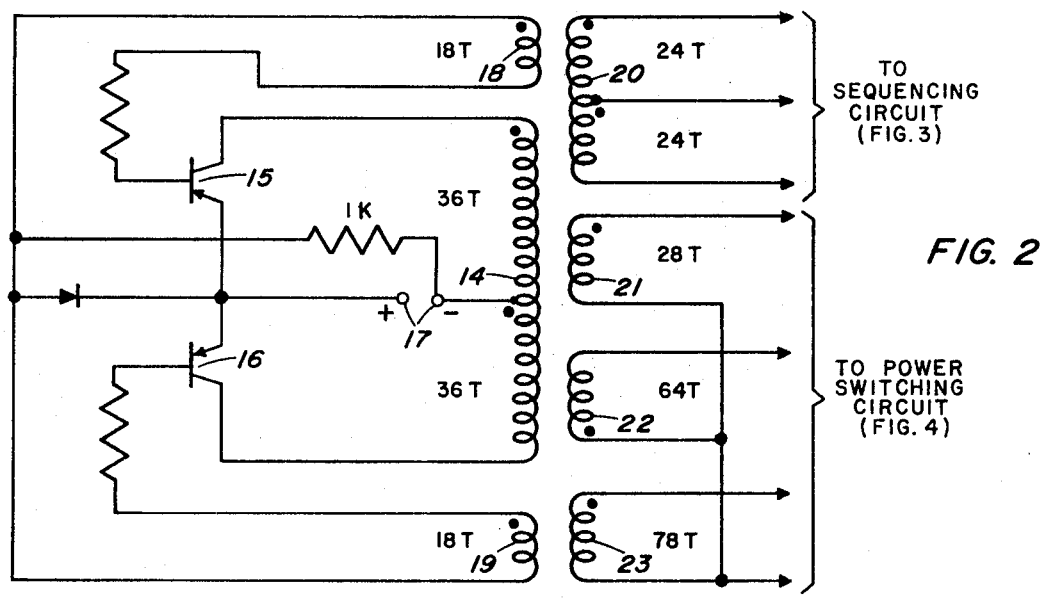

More specifically, the inverter is a simple conventional square wave static inverter that is used universally for raising or lowering DC voltages and is sometimes called the Royer circuit. Referring now to FIG. 2, the inverter includes a center tapped primary winding 14 and transistors 15 and 16 which are used as switches. The DC input voltage at terminal 17 is alternately switched through each half of the winding 14 to reverse the core magnetization each half cycle. Current flowing through the upper half of the primary winding 14 induces a voltage in the upper winding 18 to drive transistor 15 on and maintain current flow through the upper half of the primary winding. At the same time, a voltage is induced in the lower winding 19 with the proper polarity to keep the lower transistor 16 off. When the core 14 saturates, the induced voltages in both windings 18 and 19 go to zero and the transients cause transistor 15 to cut off and transistor 16 to go on, thus reversing the induced voltage in all coils. This continues until the core 14 saturates in the opposite direction causing transistors 15 and 16 to switch back to their original states and complete one cycle of the inverter operation.

The voltage induced in secondary windings 20, 21, 22 and 23 are alternating square waves which can have any desired magnitude depending on the number of turns on the secondary winding. For the example shown in FIG. 2 for illustrative purposes, a DC voltage of 7.5 volts at terminal 17 and with 18 turns in winding 18, 72 turns in winding 14, 18 turns in winding 19, 48 turns in winding 20, 28 turns in winding 21, 64 turns in winding 22, and 78 turns in winding 23, will produce output voltages of approximately 5.4 volts on winding 21, 12.4 volts on winding 22, and 15.2 volts on winding 23.

Figure 3:
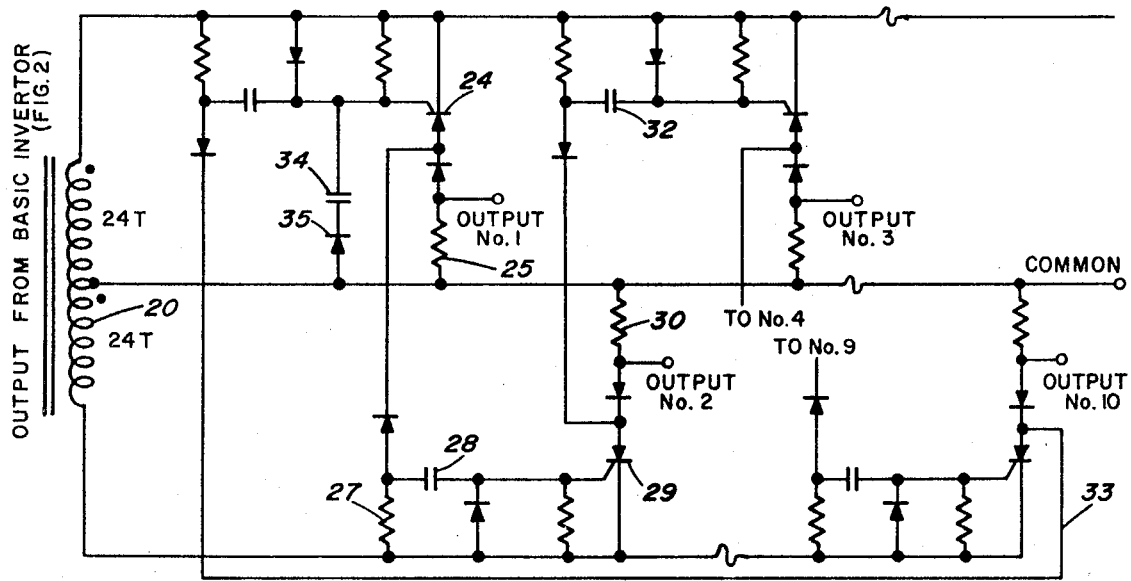

The upper center tapped winding 20 is used to drive the sequencing circuit of FIG. 3. The alternating square wave output of winding 20 makes the upper and lower busses alternating positive and negative with respect to the center tap bus at the frequency of the inverter. More specifically, FIG. 3 is drawn to illustrate a ten stage SCR circuit, though only stages 1, 2, 3 and 10 are shown in the Figure.

When the first stage fires by triggering on the silicon controlled rectifier 24, current flows from the center bus through resistor 25 and SCR 24. This current causes a negative voltage with respect to the center bus to appear at the Output No. 1 terminal and this voltage is used to trigger Triac 26 of FIG. 4. At the same time, current flows through resistor 27 of the second stage of the sequencing circuit and SCR 24. The voltage appearing across resistor 27 causes capacitor 28, on the order of 0.1 μf. to charge. This continues until the basic inverter reverses the polarity of its output. Since its output is reversed, SCR 24 in the first stage stops conducting and SCR 29 of the second stage has the correct polarity for operation. It does not conduct, however, until triggered on when its gate is supplied by the discharge of capacitor 28. The second stage operates with current flowing down through resistor 30 and SCR 29. This produces a negative voltage at Output No. 2 with respect to the center bus which is supplied as a triggering signal to Triac 31 of FIG. 4. Similarly, this voltage charges capacitor 32 of the third stage which will continue until the inverter reverses its polarity. This action is repeated for each stage in succession, and the tenth stage is connected back on lead 33 to fire the first stage so that the process continues repeatedly, firing each stage in succession. Capacitor 34, on the order of 1 μf., in series with diode 35, provides the triggering signal to the first stage when the circuit is first turned on. Capacitor 34 charges and stays charged as long as the sequencing circuit is in operation.

Figure 4:
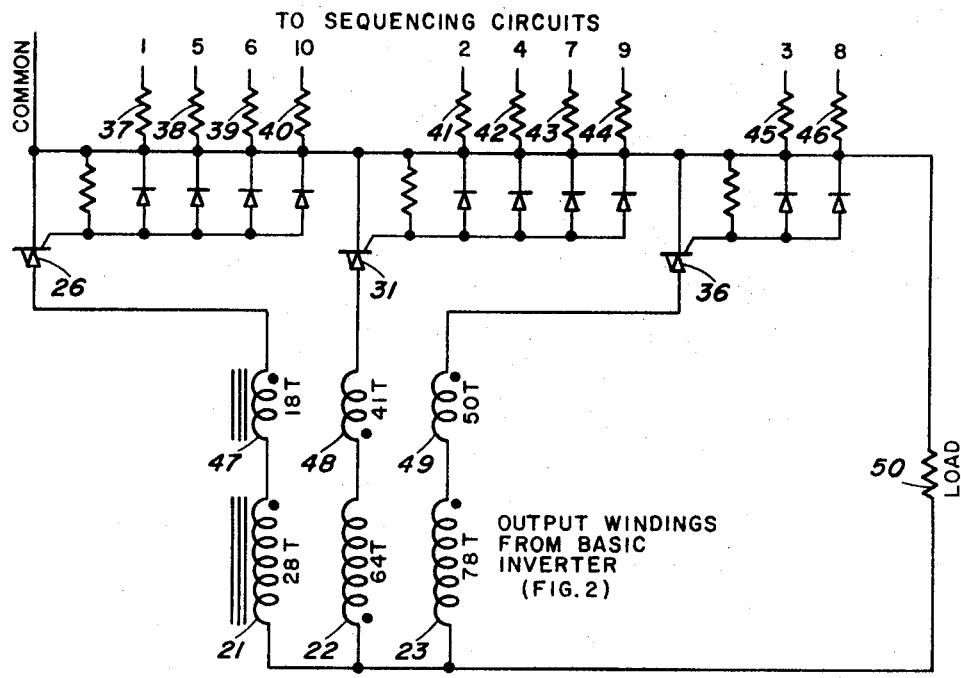
Figure 5A:
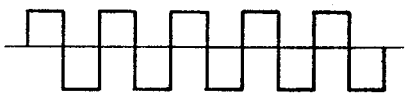
Figure 5B:
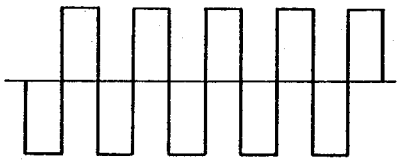
Figure 5C:
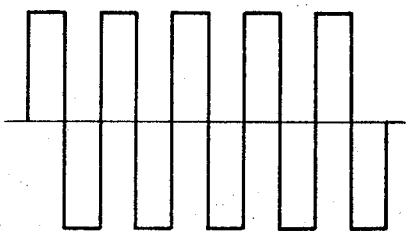
Figure 5D:
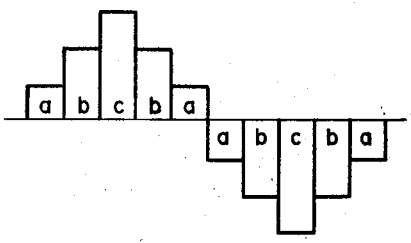

Referring now to FIG. 4, winding 21, 22 and 23, previously described in FIG. 2 supply the voltages through Triacs 26, 31 and 36. The lower terminals of each goes to a common bus and the upper terminal goes to a Triac switch. The common bus of FIG. 4 is coupled to the common bus of FIG. 3. Resistors 37 through 46 on the order of 200 ohms, are coupled to the output terminals of the 10 stages of the sequencing circuit of FIG. 3 in the order shown in order to provide the proper sequencing for triggering the Triac 26, 31 and 36 to sequentially connect the proper output from the inverter to the load 50. These Triacs operate as bidirectional switches and conduct with either polarity when triggered on. Coils 47, 48 and 49, between the Triacs and windings serve to provide some inductance in the circuit and to limit the very rapid rate of increase in voltage and current across the Triacs at the time of switching, thereby preventing the Triacs from firing spontaneously without a triggering signal. Coils 47, 48 and 49 saturate quickly and thus do not add appreciable impedance to the circuitry after becoming saturated.

The manner in which the sine wave is obtained can best be understood by referring to FIG. 5. The outputs of the three power output circuits from the basic inverter are shown in 5a, 5b, and 5c showing their relative timing and magnitude. These three outputs are shown in the power switching circuit (FIG. 4) and are each connected to the output bus through a Triac, but only one Triac is activated at any given time. Note also that the polarity of the winding 22 in FIG. 4 is reversed. Therefore, the output shown in FIG. 5b has been reversed from those shown in FIG. 5a and 5c. Thus by taking pulses successively from a, b, c, b, a, a, b, c, b, a, the synthesized curve shown in FIG. 5d is obtained. This selection is accomplished by selectively triggering the proper Triac to conduct during each half cycle supplying the proper voltage to the load 50.

An improved sine wave simulation can be made by using a larger number of steps without much increase in complexity. The number of steps N is given by the expression $4a+2$, where $a$ is any desired positive integer. The corresponding number of outputs required from the basic inverter (and also the number of Triacs) is given by the expression $(N+2)/4$, where $N$ is the number of steps. The basic inverter frequency equals $N/2$ times the frequency of the desired sine wave output. All even-numbered outputs are connected in the reverse polarity in the power switching circuit.

The use of a larger number of steps may be quite practical. With the Triacs simplifying the power switching functions because they are bidirectional and also make simpler trigger circuits possible, the chief complexity lies in the sequencing circuit. The circuit shown in FIG. 3 was constructed of discrete components. It is really only a 10-stage shift register to supply triggering signals to the Triacs. With the advent of integrated circuits in the logic field, such devices are probably already available commercially as complete units. Therefore, it should be a relatively simple matter to utilize them directly in lieu of the sequencing circuit explained above. If such devices are available, it is possible to increase the number of steps to produce a much higher quality sine wave without materially adding to the complexity.

The technique outlined above is a relatively simple method of producing a sine wave output from a solid-state inverter using semiconductor devices in the most efficient manner (as switches). The power switching technique using Triacs requires only $(N+2)/4$ switches, as compared to $N$ switches in conventional circuits. If integrated circuits are employed for the shift-register sequencing circuit, it is entirely practical to produce a reliable many-step sine wave output of high quality, using approximately one-fourth the power switches normally required. Since the basic inverter for a sine wave output with a large number of steps would be operating at a relatively high frequency, the size and weight of the inverter would be very greatly reduced because smaller cores would be required. Since the output wave closely approximates a sine wave in form, the amount of filtering required to produce an excellent sine wave output would be a minimum, thus further reducing size, weight, and filtering losses over those of more conventional inverters. The use of integrated circuit switching reduces the size and weight considerably over that of a conventional inverter of the same rating.

It is understood, of course, that the foregoing disclosure is specifically directed to selected embodiments which are preferred to cover all modifications and changes of the embodiments disclosed which do not depart from the spirit and scope of the invention.

I claim:
1. Apparatus for producing a sine wave output voltage from a DC input voltage comprising:
   an inverter;
   a sequencing circuit coupled to said inverter;
   a switching circuit comprising a plurality of bidirectional switches coupled to said sequencing circuit and said inverter for producing said sine wave output, said switches being triggered by said sequencing circuit; and
   an output load coupled to said switching circuit for receiving said sine wave output;
   wherein the improvement comprises:
   A/C means for supplying an alternating current (A/C) voltage which is coupled to said sequencing circuit;
   said sequencing circuit comprising a plurality of stages coupled together in a series manner such that each stage is triggered on, only, when the previous stage has just previously been conductive and when said A/C voltage changes polarity;
   each of said stages comprising an SCR having an anode connected to one end of a load which produces a signal to trigger said bidirectional switches, said anode being connected to a first lead of an isolated capacitor which charges to a potential when said SCR is conductive;
   a second lead of said capacitor being coupled to the gate of the next stage's SCR;
   said potential on said capacitor disposing said next stage's SCR to become conductive upon the changing of the A/C voltage polarity;
   said SCR and said next stage's SCR being disposed to conduct on opposite polarities of said A/C voltage.
2. The apparatus defined in claim 1 wherein said A/C means comprises a center tap output winding of said inverter;
   said center tap having the other end of said load of each stage of said sequencing circuit connected thereto;
   said output winding having first and second leads which are opposite in A/C polarity;
   said first lead being connected the cathode of to said SCR and said second lead being connected to said next stage's SCR.

* * * * *